April 16, 1935.  W. W. OSLUND  1,998,093
AUTOMATIC MACHINE
Filed Feb. 6, 1933  2 Sheets-Sheet 1
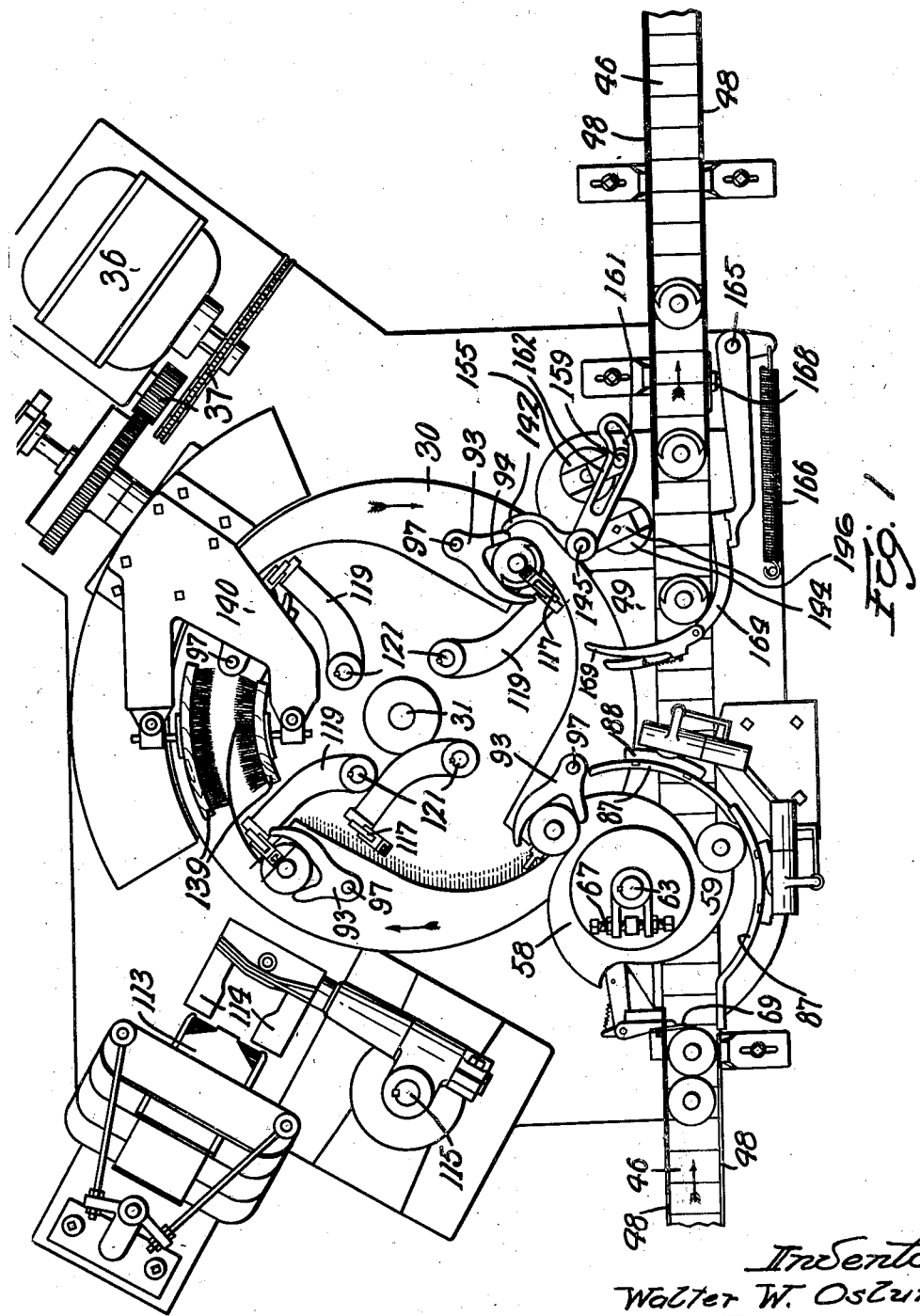
Inventor
Walter W. Oslund
By
Albert G. Blodgett
Attorney April 16, 1935. W. W. OSLUND 1,998,093
AUTOMATIC MACHINE
Filed Feb. 6, 1933 2 Sheets-Sheet 2
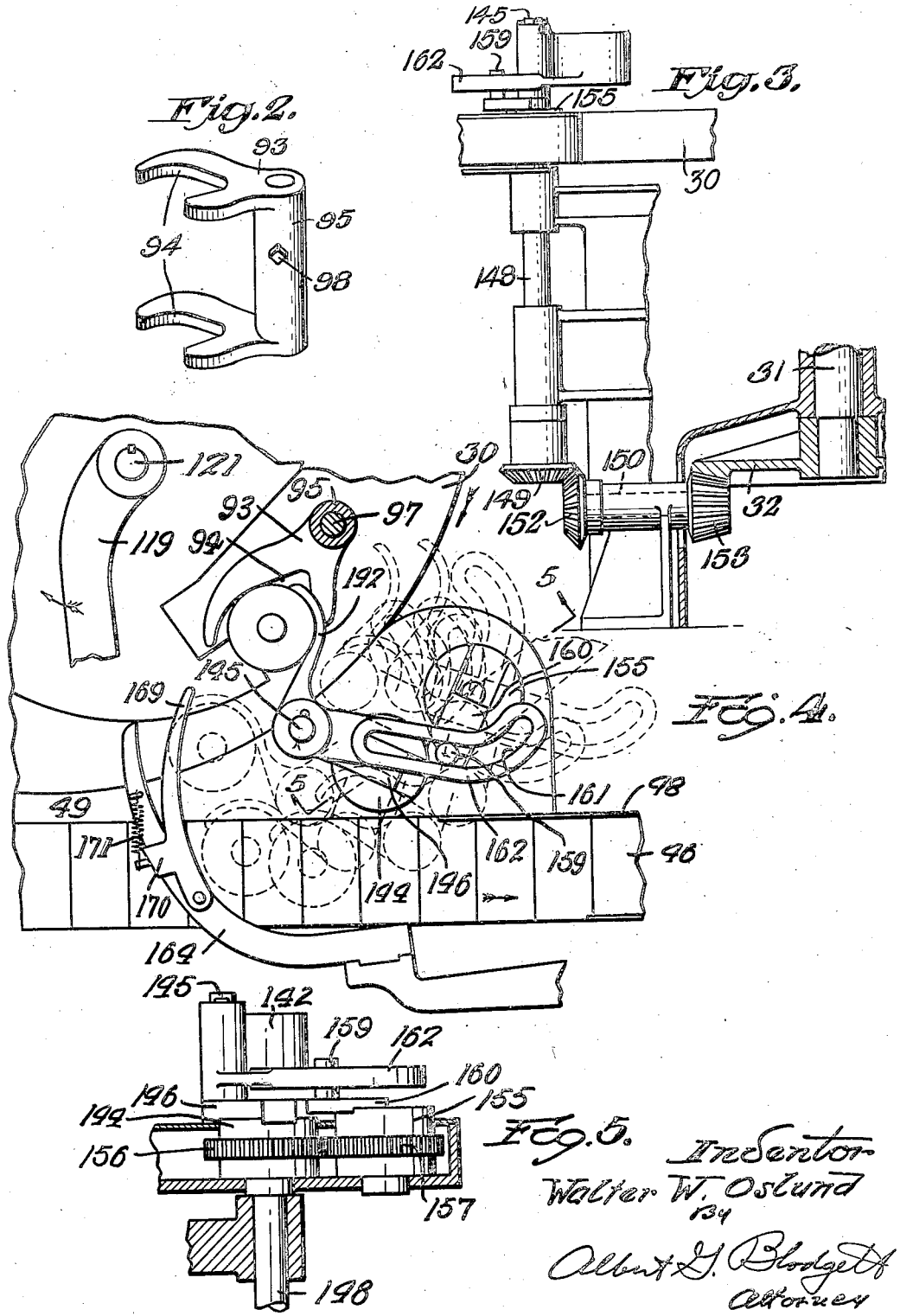

Patented Apr. 16, 1935

1,998,093

UNITED STATES PATENT OFFICE 1,998,093

AUTOMATIC MACHINE

Walter W. Oslund, Holden, Mass., assignor to The Oslund Brothers Machine Company, Incorporated, Holden, Mass., a corporation of Massachusetts Application February 6, 1933, Serial No. 655,401

14 Claims. (Cl. 198—22)

This invention relates to automatic machines, and more particularly to a machine arranged to affix labels to articles such as glass bottles automatically and at a high rate of speed.

Machines of this type ordinarily comprise a rotary table on which the bottles are supported during the labeling operation. A feeding device receives the bottles from a traveling conveyor and places them on the table, and an additional mechanism transfers the labeled bottles from the table back to the conveyor. Prior machines in this art have been complicated and expensive, and they have been subject to certain difficulties in operation. The bottles are not always held firmly throughout all parts of the cycle, and as a result breakage of bottles frequently occurs, particularly when the machine is stopped suddenly. The mechanism which removes the labeled bottles in some cases causes heavy shocks to the bottles, and in other cases fails to provide adequate support for the bottles.

It is accordingly one object of the invention to provide a comparatively simple and inexpensive automatic machine which is particularly adapted for affixing labels at a very high rate of speed, and which will operate for long periods without attention or repair.

It is a further object of the invention to provide an automatic machine which will hold the bottles or other articles firmly throughout the entire cycle of operation and thus prevent breakage of the articles caused by sudden stopping of the machine.

It is a further object of the invention to provide a simple and inexpensive transfer mechanism particularly suitable for removing labeled articles from the table of a labeling machine.

It is a further object of the invention to provide a transfer mechanism which will remove glass bottles from the table of a labeling machine rapidly and without shock and place them upon a traveling conveyor.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a top plan view of a bottle labeling machine;

Fig. 2 is a perspective view of a bottle supporting bracket;

Fig. 3 is an elevation, partly in section, showing the driving means for the bottle removing mechanism;

Fig. 4 is a plan view of the bottle removing mechanism; and

Fig. 5 is a section on the line 5—5 of Fig. 4.

In the drawings I have shown a machine particularly suitable for affixing labels to glass bottles, but it will be apparent to those skilled in the art that the invention can be used advantageously in connection with automatic machines in general.

The embodiment illustrated comprises a circular table 30 which is arranged to be rotated in a clockwise direction as viewed in Fig. 1. The table is driven by means of a vertical shaft 31 therebeneath which is provided at its lower end with a large bevel gear 32 (Fig. 3). This gear is driven by an electric motor 36 (Fig. 1) which is connected thereto by a suitable speed reducing mechanism 37.

The unlabeled bottles are delivered to the machine and the labeled bottles delivered therefrom by the usual endless conveyor chain 46, the usual guide rails 48 being provided at each side of the track to keep the bottles thereon. A flat horizontal shelf 49 is provided between the chain and the table even with the top thereof.

In order to transfer the unlabeled bottles from the conveyor chain 46 to the table 30, I utilize a feeding turret 58 which is rotated about a vertical axis in a counter-clockwise direction as viewed in Fig. 1. This turret is provided with a plurality of bottle-engaging hooks or abutments 59 which are equally spaced about its circumference, there being three of these hooks in the illustrated embodiment. The turret is mounted on the upper end of a vertical shaft 63 which is driven at the correct speed relative to the table 30 by suitable mechanism (not illustrated). A suitable adjusting means 67 (Fig. 1) is preferably provided so that the angular relationship of the turret to the shaft 63 may be altered slightly if necessary to produce the desired operation. It will be noted that the shaft 63 is positioned between the conveyor chain 46 and the table 30, and the turret extends over the chain in a position to receive the bottles carried thereby. A suitably actuated movable stop 69 is located in the path of the bottles on the chain 46, to synchronize the delivery of the bottles to the turret and the successive arrival of the hooks 59 to the bottle receiving position, as otherwise the bottles would frequently be crushed by the hooks.

As soon as a bottle is engaged by one of the hooks 59 it is carried around thereby and placed upon the table 30. During this movement the bottles are supported and held against the turret 58 by means of two arcuate guide rails 87 arranged substantially concentric with the turret. These guide rails are yieldably urged toward the turret by suitable means, and since each rail contacts with only one bottle at a time the bottles are firmly held.

As soon as each bottle is placed on the table 30 by the rotating turret, it is engaged by a bottle supporting bracket 93 mounted on the upper surface of the table and near the outer edge thereof. There are a plurality of these brackets (four being illustrated) equally spaced about the circumference of the table. The speed of the turret 58 is related to the speed of the table in the ratio of the number of brackets to the number of turret hooks 59. With four brackets and three turret hooks, the turret should rotate four times while the table is rotating three times. As shown particularly in Fig. 2, each bracket 93 comprises two vertically spaced double-pronged or V-shaped forks 94, and a connecting portion shown as a vertical post 95. The forks 94 project horizontally from the post in vertical alignment with each other, and the prongs at one side of the forks are considerably longer than the other prongs. Moreover the extremities of these longer prongs preferably curve toward the shorter prongs, for a purpose which will be made apparent later in this description. The brackets 93 are mounted on the table 30 with the forks 94 extending forward in the direction of rotation, and with the longer prongs located on the side toward the center of the table. The forks 94 are so shaped that when the bottle is in position in the forks a considerable space will be allowed between the bottle and the post 95. The advantage of this construction will be explained later herein. The brackets may be held on the table in various ways. In the illustrated embodiment vertical studs 97 extend upwardly from the table, and the posts 95 are made hollow to fit over these studs, set screws 98 being provided to hold the brackets firmly on the studs.

After the continued rotation of the table has carried the bottle a short distance away from the feeding turret, labels from a storage magazine 113 are applied to the bottle by means of movable label pickers 114 which are actuated by a suitable driving mechanism 115. Various constructions for this purpose are known in the art, and no detailed description of these parts will be made herein, since the present invention is concerned with other features of the machine.

As soon as the labels are brought to the bottle by the pickers, label grippers are moved into position to hold the labels against the bottles, whereupon the pickers are withdrawn. Each label gripper comprises a vertical bar 117 which carries label engaging members provided with label contacting surfaces of sponge rubber of other suitable material. Each bar 117 is mounted on the outer end of a horizontal arm 119 which is secured to the upper end of a vertical shaft 121 extending downwardly through the table 30. The central portion of the table, over which the arms 119 swing, is preferably depressed below the outer portion on which the brackets 93 are mounted.

The movements of the label grippers are controlled by a suitable mechanism.

After the labels have been applied to the bottle, and the pickers have moved out of the way, the rotation of the table carries the bottle between a pair of wipers 139 (Fig. 1) shown as arcuate shaped brushes mounted in a suitable supporting frame 140. These brushes wipe the adhesive coated ends of the labels against the bottle. No attempt has been made to illustrate the detailed construction of these wipers, since they may be of conventional form and are well known in this art.

As the labeled bottles reach a position near the conveyor chain 46, they are transferred from the table to the conveyor by a mechanism which will now be described. This mechanism comprises a single hook-shaped member or device 142 which is moved over the surface of the table in synchronism with the rotation thereof, and which engages each bottle at the proper time and removes it from the table. This member is preferably given a peculiar motion which is a combination of translation in a circular path about a vertical axis and oscillation in a horizontal plane about a point fixed relative to the member. This is brought about by moving one point on the member in a horizontal circular path without rotating the member, and at the same time oscillating the member about a vertical axis passing through said point in synchronism with its movements in the circular path.

In the preferred construction illustrated I have provided a head 144 located between the table and the conveyor chain and arranged to be rotated about a vertical axis in a direction opposite to that of the table, that is, in a counterclockwise direction as viewed in Fig. 4. The member 142 is pivoted to the head 144 about a vertical axis spaced from the axis of rotation. This pivotal connection is formed by a vertical pin 145 which projects upwardly from a horizontal bar 146 slidably adjustable in the top of the head 144 to permit a variation in the radial distance of the pin from the axis of rotation. The head 144 is mounted on the upper end of a vertical rotatable shaft 148 which carries a bevel gear 149 on its lower end, as shown in Fig. 3. This gear is driven by means of a short shaft 150 having on one end a bevel pinion 152 in mesh with the gear 149 and on the other end a beveled pinion 153 in mesh with the main bevel gear 32. These gears are so proportioned that the head 144 completes one rotation each time a bracket 93 arrives opposite thereto. With four brackets on the table, the head should rotate at exactly four times the speed of the table. It will be noted that the head 144 imparts to the member 142 the above described motion of translation.

In order to produce the desired motion of oscillation as well, I provide a second head 155 adjacent to the head 144 and likewise rotatable about a vertical axis. The two heads are rotated at the same speed but in opposite directions. This is accomplished by mounting a gear 156 on the head 144, and a similar gear 157 on the head 155 in mesh with the first gear. The head 155 carries an eccentric vertical pin 159 which projects upwardly from a horizontal bar 160 slidably adjustable in the top of the head to vary the radial distance of the pin from the axis of rotation. The pin 159 engages a slot or guideway 161 formed in a horizontal tail piece or extension 162 integral with the hook-shaped member 142. The member 142 and the extension 162 are approximately at right angles, and the pin 145 is located at their intersection. The shape of the slot 161 may be varied as desired, but I prefer to curve the outer portion of the slot toward the hook 142, since this results in a more pronounced slowing of the hook as soon as the bottle is placed on the conveyor chain. The angular relationship of the two pins 145 and 159 may of course be adjusted by varying the relative points of engagement between the gears 156 and 157. I have found that good results will be obtained if the bar 160 is substantially at right angles to the bar 146 when the hook 142 first engages the bottle, as shown in Fig. 4. In this figure I have indicated in light broken lines the successive positions of the hook at eight equally spaced time intervals throughout the cycle. It will be noted that the hook moves very fast while over the table and much more slowly while over the conveyor. This makes it possible to remove the bottle in the same general direction as the bracket 93 is traveling, without interference with the bracket, and yet the bottle is immediately slowed down sufficiently to avoid any tendency to slide it along the comparatively slow moving conveyor and thus possibly tip over the bottle. The hook engages the bottle by reaching into the space bounded by the two forks 94, the bottle, and the post 95. If the bottle were in contact with the post, this would not of course be possible.

A pair of vertically spaced arcuate guide rails 164 are preferably provided outside the path of the bottles as they are being transferred by the hook 142. These rails are preferably yieldably supported by mounting them on a vertical pivot pin 165 (Fig. 1) and providing a tension spring 166 to urge them against a suitable stop 168. In order to eliminate still further any shock to the bottles as they leave the table, I mount a finger 169 on the extremity of each guide rail. Each finger is pivoted to its guide rail and provided with a hook portion 170 which is yieldably held against the outer surface of the guide rail by means of a tension spring 171. These fingers 169 are located in different horizontal planes from the bracket forks 94, so that these parts cannot interfere. The ends of the fingers extend over the surface of the table and as close to the path of the bracket posts 95 as is practicable without interference. It will be apparent from an inspection of Fig. 4 that the curved extremities of the long inner prongs of the brackets perform an important function in directing the bottle outwardly toward the fingers 169. These fingers cooperate with the hook 142 in changing the direction of travel of the bottles without shock.

The operation of the invention will now be apparent from the above disclosure. The unlabeled bottles are placed upon the left end of the conveyor chain 46, which is traveling toward the feeding turret 58. As a bottle reaches the turret, it will be engaged by one of the hooks 59, carried around thereby and placed on the table 30 directly in the path of a bracket 93, which will immediately engage the bottle. Shortly thereafter the adhesive coated labels will be applied to the front surface of the bottle by the pickers 114, and a label gripper 117 will immediately be brought into contact with the central portions of the labels. The pickers will thereupon withdraw, and the bottle will pass between the brushes 139, which will wipe down the ends of the labels.

When the labeled bottle reaches a position near the hook 142, the label gripper 117 will swing away from the bottle, and the hook 142 will immediately engage the bottle and transfer it from the table to the conveyor chain 46, which will carry it to any suitable receiving apparatus (not shown). The hook moves very fast while over the table, since it has to engage the rear surface of the bottle, which is traveling rapidly due to the rotation of the table. Furthermore, the bottle must be withdrawn fast enough to prevent it from being struck by the outer prongs of the bracket forks 94. As the bottle reaches the conveyor, however, the hook slows up considerably, so that there is no tendency to hurl the bottle along the conveyor.

It will be apparent to those skilled in the art that the present machine is simpler, less costly to manufacture, and more effective in operation than any other machine heretofore produced for the same purpose. The brackets 93 form a simple and effective support for the bottles, and by providing a space between the bottle and the post 95, they make it possible to use the simple hook member 142 for removal. Furthermore, with this bracket construction, the labels can be wrapped entirely around the bottle if desired by a suitable wrapping mechanism.

Having thus described my invention, what I claim as new and desire to secure by Letters Patent is:

1. A transfer mechanism comprising a member arranged to rotate about a substantially vertical axis, a transfer device pivoted to the member about an axis spaced from and parallel to the first axis, a second member rotatable about a third substantially vertical axis at the same rate as the first member but in the opposite direction, and connections between the second member and the transfer device which controls the movements of the transfer device about its pivot.

2. A transfer mechanism comprising a member arranged to rotate about a substantially vertical axis, a hook-shaped device pivoted to the member about an axis spaced from and parallel to the first axis, said device having a guideway formed therein, and a second member rotatable about a third substantially vertical axis at the same rate as the first member but in the opposite direction, the second member having a projection which engages the guideway and controls the movements of the device about its pivot.

3. A transfer mechanism comprising a stud spaced from and arranged to revolve about a substantially vertical axis, a hook-shaped member pivotally supported on the stud, a tail piece projecting horizontally from the member and shaped to provide a guideway, and a second stud spaced from and arranged to revolve about a second substantially vertical axis at the same rate as the first stud but in the opposite direction, the second stud engaging the guideway.

4. A transfer mechanism comprising a head rotatable about a substantially vertical axis, an upwardly projecting pin eccentrically mounted thereon, a hook-shaped member pivotally supported on the pin and provided with a horizontal extension having a slot therein, a second head near the first head and likewise rotatable about a substantially vertical axis, a gear rotatable with the first head, a gear rotatable with the second head and meshing with the first gear, the two gears being of the same diameter, and an upwardly projecting pin eccentrically mounted on the second head and engaging the slot to control the movements of the member.

5. A machine comprising a table rotatable about a vertical axis, a member located near the table and arranged to rotate about a vertical axis in the opposite direction from the table, a hook-shaped device eccentrically pivoted to said member and arranged to move over the table to remove articles therefrom, said device having a guideway formed therein, and a second member rotatable about a vertical axis in the same direction as the table, the second member having a projection which engages the guideway and controls the movements of the device about its pivot.

6. A machine comprising a table rotatable about a vertical axis and adapted to support articles at a plurality of stations, a transfer device arranged to engage the rear surface of each article and move it in a generally forward direction relative to the table, and deflector means fixed to the table adjacent each station and arranged to direct each article outwardly away from the axis of the table when the article is moved by the transfer device.

7. A machine comprising a table rotatable about a vertical axis and adapted to support articles at a plurality of stations, a hook-shaped member movable over the surface of the table in the direction of table movement but at a higher speed, said member being adapted to engage the rear surface of each article and move it in a generally forward direction relative to the table, and deflector means fixed to the table adjacent each station and arranged to direct each article outwardly away from the axis of the table when the article is moved by the hook-shaped member.

8. A machine comprising a table rotatable about a vertical axis, a plurality of article-supporting brackets thereon, each bracket having a double-pronged fork open in the direction of travel, and the inner prongs being longer than the outer prongs and curved toward the outer prongs, and a transfer device to remove the articles from the brackets in a generally forward direction, the curved inner prongs serving to direct the articles away from the axis of the table as they leave the brackets.

9. A machine comprising a table rotatable about a vertical axis, a plurality of article-supporting brackets thereon, each bracket having two vertically spaced double-pronged forks open in the direction of travel, and the inner prongs being longer than the outer prongs and curved toward the outer prongs, and a transfer device to remove the articles from the brackets in a generally forward direction, the curved inner prongs serving to direct the articles away from the axis of the table as they leave the brackets.

10. A machine comprising a table rotatable about a vertical axis, a plurality of article-supporting brackets thereon, each bracket having two vertically spaced double-pronged forks open in the direction of travel and a post connecting the rear portions of the forks, the brackets being shaped to provide a space between each article and the corresponding bracket post, and a transfer member arranged to enter the said space and engage the rear surface of the article to remove the same from the bracket in a generally forward direction.

11. A machine comprising a table rotatable about a vertical axis, a plurality of article-supporting brackets thereon, each bracket having two vertically spaced double-pronged forks open in the direction of travel, and the inner prongs being longer than the outer prongs and curved toward the outer prongs, and a transfer member arranged to engage the rear surface of an article between the upper and lower forks and remove the article from the bracket in a generally forward direction, the curved inner prongs serving to direct the articles away from the axis of the table as they leave the brackets.

12. A machine comprising a table rotatable about a vertical axis, a member located near the table and arranged to rotate about a vertical axis in timed relation with the table, a transfer device eccentrically pivoted to said member and arranged to move over the table, and guide means connected to the transfer device to prevent rotation thereof and at the same time cause the device to oscillate about its pivot in synchronism with the rotations of said member.

13. A machine comprising a table rotatable about a vertical axis, a conveyor located near the table, a member located between the table and the conveyor and arranged to rotate about a vertical axis in the opposite direction from the table and in timed relation therewith, a transfer device eccentrically pivoted to said member and arranged to move over the table and transfer articles therefrom to the conveyor, and guide means connected to the transfer device to prevent rotation thereof and at the same time cause the device to oscillate about its pivot in synchronism with the rotations of said member.

14. A transfer mechanism comprising a member arranged to rotate about a substantially vertical axis, a transfer device pivoted to the member about an axis spaced from and parallel to the first axis, said device being shaped to provide a guide means, and a second member rotatable about a third substantially vertical axis at the same rate as the first member but in the opposite direction, the second member having means eccentrically positioned thereon which engages the guide means and controls the movements of the device about its pivot.

WALTER W. OSLUND.